US009613142B2

(12) United States Patent
Belan et al.

(10) Patent No.: US 9,613,142 B2
(45) Date of Patent: Apr. 4, 2017

(54) METHOD AND SYSTEM FOR PROVIDING THE DOWNLOAD OF TRANSCODED FILES

(75) Inventors: Adi Belan, Tel Aviv (IL); Adi Weiser, Givatayim (IL); Yoav Weiss, Saint Donal sur'l Herbasse (FR); Jenia Gorokhovsky, Netanya (IL)

(73) Assignee: FLASH NETWORKS LTD, Herzliya (IL)

( * ) Notice: Subject to any disclaimer, the term of this patent is extended or adjusted under 35 U.S.C. 154(b) by 0 days.

(21) Appl. No.: 13/086,369

(22) Filed: Apr. 13, 2011

(65) Prior Publication Data

US 2011/0264676 A1 Oct. 27, 2011

Related U.S. Application Data

(60) Provisional application No. 61/328,022, filed on Apr. 26, 2010.

(51) Int. Cl.
*G06F 17/30* (2006.01)

(52) U.S. Cl.
CPC .. *G06F 17/30784* (2013.01); *G06F 17/30849* (2013.01)

(58) Field of Classification Search
CPC ......... G06F 17/30097; G06F 17/30569; G06F 17/30784
USPC ........................... 707/756, 999.101, 999.107
See application file for complete search history.

(56) References Cited

U.S. PATENT DOCUMENTS

| 6,421,733 | B1 * | 7/2002 | Tso et al. ...................... 709/246 |
| 7,218,635 | B2 * | 5/2007 | Haddad ......................... 370/394 |
| 7,355,531 | B2 * | 4/2008 | Lai et al. ......................... 341/51 |
| 7,489,708 | B2 * | 2/2009 | Kim .............................. 370/470 |
| 7,558,296 | B2 * | 7/2009 | Toma et al. .................... 370/535 |
| 7,979,570 | B2 * | 7/2011 | Chapweske et al. ......... 709/231 |
| 8,019,885 | B2 * | 9/2011 | Yu et al. ....................... 709/232 |
| 8,271,992 | B2 * | 9/2012 | Chatley et al. ............... 718/105 |
| 2002/0178410 | A1 * | 11/2002 | Haitsma et al. .............. 714/709 |
| 2002/0180788 | A1 | 12/2002 | Wu |
| 2004/0045030 | A1 * | 3/2004 | Reynolds et al. ............ 725/110 |
| 2005/0076057 | A1 | 4/2005 | Sharma |
| 2005/0147163 | A1 * | 7/2005 | Li et al. .................... 375/240.12 |
| 2006/0047967 | A1 * | 3/2006 | Akhan et al. ................. 713/176 |
| 2006/0153293 | A1 * | 7/2006 | Hsu et al. ................ 375/240.03 |
| 2007/0083527 | A1 * | 4/2007 | Wadler et al. .................. 707/10 |
| 2007/0168542 | A1 * | 7/2007 | Gupta et al. .................. 709/231 |
| 2007/0189708 | A1 * | 8/2007 | Lerman et al. ................. 386/52 |
| 2008/0140719 | A1 * | 6/2008 | Chaney et al. ............. 707/104.1 |
| 2008/0195698 | A1 * | 8/2008 | Stefanovic et al. .......... 709/203 |
| 2008/0195761 | A1 * | 8/2008 | Jabri et al. .................... 709/250 |

(Continued)

*Primary Examiner* — Miranda Le
(74) *Attorney, Agent, or Firm* — Smith Tempel Blaha LLC; Gregory Scott Smith

(57) ABSTRACT

A technique and system that generates transcoded media files from requested original compressed media files, and then transmits the transcoded media files to a requester rather than the original compressed media files. Advantageously, the disclosed solutions provide a more bandwidth efficient downloading of media files to a requesting device. In addition, the disclosed solutions also fully support the seek function that is typically employed in media player devices. By correlating the requested original compressed media files time-wise with the generated transcoded media files, seek requests generated by a requesting device can be mapped to the appropriate or a close proximity to the transcoded media file.

31 Claims, 7 Drawing Sheets

(56) References Cited

U.S. PATENT DOCUMENTS

| | | |
|---|---|---|
| 2008/0227440 A1* | 9/2008 | Settepalli ............... 455/418 |
| 2008/0229374 A1 | 9/2008 | Mick |
| 2008/0231480 A1* | 9/2008 | Lai et al. ................ 341/51 |
| 2009/0083781 A1* | 3/2009 | Yang et al. ............. 725/20 |
| 2009/0125677 A1* | 5/2009 | Leveque et al. ......... 711/113 |
| 2009/0164793 A1* | 6/2009 | Yoshioka et al. ........ 713/180 |
| 2009/0305680 A1* | 12/2009 | Swift et al. ............ 455/414.1 |
| 2010/0070608 A1* | 3/2010 | Hosur .................... 709/218 |
| 2010/0131671 A1* | 5/2010 | Kohli et al. ............ 709/233 |
| 2010/0161825 A1* | 6/2010 | Ronca et al. ........... 709/231 |
| 2010/0235438 A1* | 9/2010 | Narayanan et al. ..... 709/203 |
| 2010/0235528 A1* | 9/2010 | Bocharov et al. ...... 709/231 |
| 2010/0306249 A1* | 12/2010 | Hill et al. ............. 707/769 |
| 2011/0019814 A1* | 1/2011 | Hasting ................. 380/28 |
| 2011/0269437 A1* | 11/2011 | Marusi et al. ......... 455/414.1 |

* cited by examiner

METHOD AND SYSTEM FOR PROVIDING THE DOWNLOAD OF TRANSCODED FILES

CROSS-REFERENCE TO RELATED APPLICATIONS

This is a utility patent application being filed in the United States as a non-provisional application for patent under Title 35 U.S.C. §100 et seq. and 37 C.F.R. §1.53(b) and, claiming the benefit of the prior filing date under Title 35, U.S.C. §119(e) of the United States provisional application for patent that was filed on Apr. 26, 2010 and assigned Ser. No. 61/328,022, which application is incorporated herein by reference in its entirety.

BACKGROUND

The present disclosure generally relates to the field of data communication over a packet switch network, and more particularly, to a solution that enables the downloading of a media file to an entity that is accessing or requesting such file by means of a media player application.

Today, more and more users, systems and applications search and browse through the Internet, accessing a variety of different web sites that offer access to and the delivery of different media files. This searching and browsing process is generally referred to as "surfing" and the entities performing the surfing are generally referred to as "surfers". A few non-limiting examples of media files accessible through surfing include video files such as Adobe Flash files, Microsoft Silverlight files, etc. The media files that are available for access and/or download can be embedded within web pages or they can be standalone media files. A few examples of popular web sites that provide a wide variety of media files for access, streaming, downloading, etc., include YouTube, Google Video, Yahoo Video. Many other web sites are also available for gaining access to media files.

Some video files use container-file-format for delivering video files over a Hyper Text Transfer Protocol (HTTP) based network. Usually a surfer can use a video player in order to observe a video file. An exemplary player can be a Flash Player. The player may be an application that can be invoked by the surfer's browser application, an embedded feature of a browser, a stand-alone application and even a stand-alone device. A few examples of such video Players that are commonly used include the Adobe Flash Player and the Microsoft Silverlight player, however, many other players are also available for use.

Within this description and the below-recited claims, the terms "Adobe Flash file", "Microsoft Silverlight file", "video file", any other type of file and "media file" can be used interchangeably and the term "media file" can be used as a representative term for the different types of files.

For a variety of reasons, including the complexity of the technology and the level of clarity and resolution provided, a typical video file can be rather large in size. Consequently, downloading of a typical video file can consume a significant amount of bandwidth and require a considerable amount of time. Although when first introduced, such video files were typically only available for downloading to computers connected via hardwired connections to the Internet, technology has advanced to the point where such video files are available for download over wireless networks to mobile devices. For instance, mobile devices such as, but not limited to, notebook computers, cellular telephones or handsets, handheld computers, Personal Data Assistants (PDA), or other computing device with wireless communication capabilities are able to access, download and view high-definition video content. Although technology advancements have greatly improved the bandwidth available to mobile devices thereby improving the download speed of data, the download time for mobile devices is still somewhat bandwidth limited compared to hardwired access to the Internet and as such, mobile devices can experience considerable delays when downloading video files.

The typical video player can commence the presentment of video content after only a portion of a video file is received and while the remainder of the video file is still being downloaded. Usually, the time required to download a video file is less than the time required to present the video file. Therefore the video data that has been downloaded but that has not yet been rendered or presented by the video player can be stored in a buffer. In many situations, a surfer may decide to stop watching the video or to skip to another web page before reaching the end of the entire video file. Thus, it can be appreciated that for such situations, the buffered video data that was downloaded and stored actually resulted in a waste of bandwidth consumption. For instance, the buffered portion of the video that was not used or viewed required an amount of bandwidth to download and thus, the bandwidth consumed for downloading this non-viewed section of the video file was wasted and could have been allocated to other needs.

Typical video players provided a progress bar that graphically indicates how much of a video file has been downloaded, what portion of the video file had been viewed and where the currently viewed video is located within the file. In addition, such features may also include a "seek" or forward/reverse feature. By pressing on a certain place along the progress bar, a surfer can control the location from which the player will present the next video frames. A common progress bar can illustrate the runtime that is needed for playing the entire received video file. This feature can help to reduce the time and bandwidth wasted in viewing undesired sections of the video file during the downloading of the video file.

More specifically, a typical progress bar can provide several indications. For instance, the progress bar may indicate the current location along the bar of what is being viewed. Other indications can present the location along the time bar of the information stored in the buffer relative to the amount of information that needs to be downloaded. In some applications or players, two types of units can be associated with a progress bar and/or seek request, a time unit (seconds, for example) or a volume/size unit (number of bytes, for example). The type of units can vary from one web site to the other or even from one video file to the other.

Because of their large size and the value of bandwidth, video files are often-times compressed to reduce their volume. Common compression methods can be based on standards such as, but not limited to: H.263, H.264, MPEG2, MPEG4, etc. The H.263 and H.264 methods are International Telecommunication Union (ITU) standards and MPEG2 and MPEG4 are Moving Picture Experts Group (MPEG) standards. More information on the above-identified standards can be found at the web sites available using the following URL information where the symbol <dot> represents a period in the URL: www<dot>itu<dot>int or www<dot>mpeg<dot>org (respectively), the content of which is incorporate herein by reference. Some of the compression methods are more efficient than the others. For instance, the H.264 technique is more efficient than the H.263 technique. Consequently, a video file that is compressed according to the H.264 standard has fewer bytes than the same video file, which compressed according to the H.263 standard without having any adverse affects or degradation of the presentation quality.

A stream of compressed media files that have been compressed using a typical compression technique can include several types of frames. As non-limiting examples, the types of frames can include: an Intra frame, an Inter frame, etc. An Intra frame can also be referred as a key frame. The terms "Intra Frame" and "Key Frame" are used interchangeably throughout this description and the claims. The media data of an Intra frame (key frame) is compressed relative to information that is contained only within the current frame and not relative to any other frame in the media sequence. In contrast to an Intra frame, an Inter frame is a frame in a media compression stream which is expressed in terms of one or more neighboring frames. The present disclosure refers to a key frame or an Intra frame as a frame that can enable proper decoding done on a portion of a media file from the key frame (Intra frame) to the end of the file.

A media file (such as a Flash file, for example) can and typically does include embedded metadata. The embedded metadata can be transmitted before the video data. The metadata may include the location of different Key frames in the compressed media file. For instance, the metadata may identify an offset in data units (bytes, octets, bits, words, etc.) and/or time units within a media file where the beginning of a key frame can be located.

An access network operator (ANO) is the entity that provides, provisions and manages infrastructure that provides access to the Internet for subscribers. Examples of an ANO can be a telecom operator, such as but not limited to: a cellular operator, a satellite communication service provider, a Public Switched Telephone Network (PSTN) operator, Internet Service Provider (ISP) premises, etc. Thus, the main commodity that an ANO delivers is bandwidth and as such, ANOs seek and employ the use of different methods for handling the downloading of media files to improve the utilization of their bandwidth resources. Some of the methods include a buffer limiter which limits the amount of data (i.e., the number of bytes) that can be downloaded by an entity until the entity observes previously downloaded data.

Other methods can reduce the volume or size of the video files that are transferred via an access network. Reduction of the volume of the video files can be done on the fly by converting the format of the media file into streaming and transcoding (converting) the compression standard used into an improved compression standard during downloading of the file. For example, if a media file was compressed according to H.263, an exemplary ANO can transcode the compressed video into H.264 thereby reducing the file size. Such a transcoding can improve the surfer's experience by accelerating the rendering of the video file as well as reducing the bandwidth consumption over the communication links between a surfer and the access network.

BRIEF SUMMARY

Exemplary embodiments of the present disclosure present a novel system, method and technique for providing transcoded files. The transcoded files are provided to a requesting device, such as a surfer operating a browser, a web-connected device, a media player, or any of a variety of computing devices that may download and render media content, and particularly video media content.

The disclosed transcoded file provider enables a proper seek operation in a transcoded media file, such as a video file. It has been observed that transcoding a media file can have an effect on the seek operation. Because the seek operation is commonly used by surfers that download media files, there is a need for the disclosed solution.

To provide the seek function to a surfer, it is important to be able to properly index or select different locations within a media file. However, after providing a transcoding function on an original compressed media file, the number and the location (offset in bytes from the beginning of the file) of Key frames in the transcoded file are different than the number and the location of Key frames in the original compressed media file. The original metadata, which is generally transmitted prior to or independent from the transcoding of the video file, no longer represents the correct location of or offsets to the Key frames in the transcoded file. Consequently a seek function may not function properly for such a file.

It should be appreciated that the above-described deficiencies in the transmission of transcoded media files are not intended to limit the scope of the disclosed inventive concepts in any manner. The deficiencies are merely presented for illustrating an existing situation that can be overcome or alleviated by various embodiments of the transcoded file provider.

This disclosure refers to a key frame or an Intra frame as a frame that can enable proper decoding done on a portion of a media file from the key frame (Intra frame) to the end of the file. Consequently, to enable proper decoding of the received compressed video, after jumping to the new point on the progress bar, the delivered compressed file, in response to a seek request, has to start in association with a beginning of a Key frame. It can be the key frame itself or a header before the key frame, for example.

While a media file is being rendered, a seek operation can be performed in a variety of manners. A non-limiting example includes a user sliding a cursor along the progress bar to a new location in the media file. After obtaining the new location along the progress bar, a common media player can convert the selected or requested location to a byte number in the compressed file or to a relative time compared to the total runtime of the media file. The value of the offset of the seek point, in bytes or in time, can be added as a parameter to the Uniform Resource Locator (URL) of the media file included in the seek request that is sent to a web-server sourcing the media file, for example. In some cases, other HTTP headers can be used for indicating the offset or seek location. Using time or byte units for indicating the offset of the seek request from the beginning of the media file depends on the media file and may vary from one media file to another. If time units are used in the seek request, then the web-server can search the metadata of the compressed file for the location, in bytes, of the nearest Key frame to the relative point in time. If byte units are used in the seek request, then a media player at the requesting client, can search the metadata of the compressed file for the location, in bytes, of the nearest Key frame to the relative seek point and the location, in bytes, of the nearest Key frame in the compressed file can be transmitted to the web server as a parameter of the URL or other HTTP header associated with the offset of the seek request. In both cases the seek request can be sent via a new connection to the sourcing web-server.

It has been observed that the runtime of a transcoded media file and the runtime of the original compressed media file are similar in both files. Therefore, exemplary embodiments of the present description can utilize the similarity of the runtime of the transcoded file and the original compressed file to define an appropriate location of a seek request along the progress bar of the transcoded file. Furthermore, exemplary embodiments of the present disclosure can utilize the web server, from which the original compressed file was received, for responding to a seek request. The disclosed exemplary method and system can utilize the web server itself for determining the requested offset, in bytes, from the beginning of the original compressed media file, for example.

An exemplary Transcoding-Management Server (TMS) can be located between an end user or end user device/application (collectively referred to as surfer equipment) and a web site, at an access network, for example. The TMS can intercept the data traffic between a plurality of surfer equipment, in one side of the access network, and the Internet, on the other side of the access network.

An exemplary TMS can be implemented by using two databases (DB). One database (DB) can be used for storing a plurality of media files that are waiting to be transcoded. This DB can be referred as Caching DB (CDB). The second DB can store a plurality of transcoded video files; this DB can be referred as a Transcoded DB (TDB). In some exemplary embodiment a single DB can be used for storing the two types of video files. It should also be appreciated that a database can be defined as a collection of data that is organized so that its contents can easily be accessed, managed, and/or updated. Thus, throughout the description, the use of the term database simply means a memory element or memory device that is capable of housing or storing data in such a manner that the data can be organized within the memory element for ease of access, management and or updating, or, the data may simply be stored in the memory element and information external to the memory element defines the structure of the data within the memory element. Thus, the term database for purposes of the disclosure may simply refer to raw data stored within a memory element, data stored in the memory element in a predetermined and highly structured manner, as well as any other variations.

Several tables can be used by the TMS in the provision of the transcoding services. The tables can assist the TMS in different operations. Operations such as, but not limited to: managing the different databases; offline transcoding operation; online responding to a request for a media file, online responding to a seek response on a transcoded media file, and so on. The Caching DB can be managed by using a Caching DB Table (CDB-T).

The Caching DB Table (CDB-T) can have a plurality of entries. Each entry in the CDB-T can be associated with a received original compressed media file. Each entry can include different information pertaining to the original compressed media file. Exemplary information can be: a pointer to the beginning of a metadata of an original compressed media file (if the metadata exist); a pointer to the beginning of an original compressed media file in the CDB; the file size, the compression standard utilized, an identification of the file, etc. In some embodiments, the identification of the original compressed media file can be a signature, which is received by implementing a hash function on a predefine number of bytes from the beginning of the original compressed media file as it is disclosed below within the detailed description. Different fields in each entry can store management data such as, but not limited to: the time of receiving the first request for the original compressed media file, the time of the last request, a counter on the number of requests and so on. The CDB-Te can be used for determining which original compressed media file from the CDB will be transcoded next or deleted, for example.

There are compressed media files that are not associated with metadata. When such a compressed media file is received, the compressed file can be parsed and a metadata can be generated for it. An exemplary metadata file can include information such as: compressed key frame (CKF) offsets from the beginning of the file; time-codes of each compressed key frame, etc. Usually the generated transcoded file is associated with a metadata that is created during the transcoding operation.

The TDB can be managed by a TDB table (TDB-T), for example. The TDB-T can have a plurality of sections. Each section can be associated with a transcoded media file. Each section can include: a pointer to the beginning of a metadata of the transcoded media file; a pointer to the beginning of a transcoded media file in the TDB; and so on. Other exemplary information that can be stored in a section can be management data. Exemplary management data can be: the time of receiving the first request for the transcoded media file, the time of the last request, a counter for the number of requests, and so on. The management data can be used for determining which transcoded file can be deleted, for example.

Each section in the TDB-T can include a plurality of entries. Each entry in the TDB-T can be associated with a transcoded key frame in the transcoded media file and each entry can include a plurality of fields. Exemplary fields for the TDB-T entries may include, but are not limited to: a field for storing one or more signatures (markers or hash values); a field for storing an offset in bytes of the beginning of a transcoded key frame from the beginning of the transcoded media file; a field for storing a time-code of a transcoded Key frame; etc. In some cases, wherein a header is added in front of the relevant key frame, the hash function can be implemented after the header.

An exemplary signature (marking, hash value) procedure can be done by implementing a hash function over a pre-defined number of bytes. The signature procedure can be performed on a plurality of locations along the original compressed media file. The location can be referred as a compressed video offset (CVO), for example.

An exemplary hash function can be MD5. Other exemplary embodiments may use other hash functions such as, but not limited to: MD4, SHA-1, SHA-2, etc. MD5 and other different hash functions are well known in the art and are disclosed in many technical books and therefore will not be further disclosed. Throughout the description, the term MD5 can be used as a representative term for a hash function in general.

An exemplary TMS can scan the CDB-T, and select a next original compressed media file to be transcoded. The selection can be based on information stored in the management fields of the CDB-T, the size, the compression standard, the number of requests, the time from the last request, etc. The selected original compressed media file with its metadata (if any) can be sent to a transcoding engine (TE). An exemplary TE can implement one or more transcoding programs, such as but not limited to, the one included in the FFMPEG library, or a commercial transcoding server such as the one that is manufactured by RipCode Texas. A reader who wishes to learn more about transcoding servers can surf RipCode website: www<dot>ripcode<dot>com, for example.

Upon getting the transcoded media file with its metadata from the TE, the TMS can allocate a new section in the TDB for storing the transcoded file. The TMS can allocate a new section in the TDB-T accordingly. The section can be associated with the original compressed media file by storing a URL from which the original compressed media file was received, for example. In addition each section can include a pointer to the location in the TDB in which the transcoded media file and its metadata will be stored.

To alleviate overhead issues associated with frequent changes in the URLs, an alternate exemplary embodiment can implement a hash function on the first N bytes from the beginning of an original compressed media file. The hash value can be used, instead of the URL, for identifying the appropriate original compressed media file.

The metadata of the transcoded file can be parsed to retrieve the offset in bytes of the beginning of each transcoded Key frame (TKF) from the beginning of the transcoded file. For each TKF, an entry can be allocated in the appropriate section of the TDB-T and the offset, TKFO, of each TKF from the beginning of the transcoded file, can be parsed and written in the appropriate field in the relevant entry of the TDB-T, and be referred as TKFnO.

If no metadata is associated with the transcoded file, then metadata for the transcoded file can be generated. In an alternate embodiment, if no metadata is associated with the transcoded file, then the transcoded file itself can be parsed and the offsets of each TKF can be found.

If metadata is associated with the transcoded file, then a time-code of the transcoded Key frame (TKFTC), which is the time from the beginning of the transcoded file, can be written in an appropriate field in the entry of the relevant TKF. If no metadata is associated with the transcoded file, then the transcoded file can be parsed based on the value of the TKFnO. The header of each TKF can be parsed for retrieving its time-code (TKFnTC). The time-code can be written in the appropriate field of the TDB-T. At this point of time the TMS can process the original compressed file to synchronize (match) or correlate it with the stored transcoded file.

For each TKFn, its associated entry in the section of the transcoded file can be fetched. The entry can be parsed and different values may be obtained. Exemplary values may be: offset of the TKFn (TKFnO); timecode of the TKFn (TKFnTC); etc. For each TKFn, the selected original compressed media file can be searched for the byte located in the offset TKFnO. A hash function can then be executed on a pre-defined number (N) of bytes starting from the byte located in the offset TKFnO in the compressed video data.

An exemplary value of N can be few kilobytes, such as 8K bytes for example. The calculated hash value can then be written, in the appropriate field of the entry, as one of the signatures (markers). Associating the hash value in the offset of TKFnO in the selected original compressed media file can correlate the location, in bytes, in the transcoded file and in the original compressed file. The correlation can assist in a seek request that uses bytes offset in a seek request, for example.

Furthermore, the selected original compressed media file can be searched for each one of the original compressed key frames, in the original compressed media file, and the timecode for each key frame. For each original compressed key frame, the TDB-T can be searched for a TKFn that its TKFnTC is the nearest to the time-code of the relevant compressed key frame. A hash function can be executed on the original compressed media file on a pre-defined number of bytes (i.e., N bytes) starting from beginning of the relevant compressed key frame of the original compressed media file. The calculated hash value can be written as an additional marker (signature) in the appropriate field of the entry of TKFn.

The time-code of the TKFns and the time-code of the original compressed media files can be used to correlate the relevant key frames in the transcoded file and the key frames in the original compressed file. The correlation in the key frames can assist in a seek request indicating the offset in time units, for example.

After writing different correlating information and signatures, the stored transcoded file can be used or transmitted to the surfer equipment instead of the original compressed media file. Further, the selected original compressed media file can be released from the CDB.

Upon receiving a request for a media file, such as but not limited to a Flash Video, the request can be parsed and checked to determine it meets the requirements of an exemplary TMS. Exemplary requirements can be a minimum number of requested bytes to be received from the destination. For example, if the hash function needs a minimum of N bytes to calculate the hash value, then the request would not meet the requirements. If the request meets the requirements, then the request can be transferred toward its destination, a web server for example. If the request does not meet the requirements of an exemplary TMS, then the request can be modified to indicate requesting a chunk of the compressed media file that includes a larger number of bytes than the needed for calculating the hash function (i.e., equal or larger than N bytes), and the modified request can be sent toward its destination.

A seek request for a media file can be sent from a media player the user is using or from some other device, application, etc. Different players use different units for defining the offset of the seek request. One exemplary common player may send a seek request starting from a certain byte-offset from the beginning of the media file. The requested byte-offset can be the byte offset of an Intra frame (key frame) that the media payer read from the associated metadata, for example. Another exemplary common player may send a request to receive a media file starting from a certain time-offset from the beginning of the media file, and so on.

Upon receiving the requested content from a web server, it can be further processed. If it is not an original compressed media file, it will be sent toward its destination. If it is an original compressed media file, it can be parsed. If the file is an original compressed media file and the media data starts from a beginning of a key frame, then the time-code of the key frame can be parsed. If the time-code is zero, indicating the beginning of a media file, then a hash function can be implemented on the first N bytes from the beginning of the received original compressed media file. The TDB-T can then be searched for a similar or matching signature (marker). If such a signature is found, this indicates that the compressed file has been previously received, transcoded and stored into the TDB. Thus, then the relevant cached transcoded file can be retrieved from the TDB and sent toward the requester instead of the received original compressed media file. In addition the URL of the received file is stored and used for the current session for seek responses.

If such a signature (marker) is not found, then the CDB-T can be searched for the hash value. If such an entry is not found, then the received compressed file can be sent toward the requester and in addition, the file can be copied to the CDB. The CDB-T can be updated accordingly with the hash value of the beginning of the compressed file and its location in the CDB.

If an entry for the hash value is found in the CDB-T, the relevant counter field can be incremented and the file or the cached file can be transferred toward its destination. The hash value of the first N bytes of the beginning of a media file in CDB-T can be used for identifying the media file instead of using its URL. In such embodiments, the hash value can be used to overcome the frequent changes in the URL of media files.

If the time-code of the received original compressed media file is not equal to zero, then a hash function can be implemented on the key frame. The TDB-T can then be searched for a signature that equals the hash value. If a matching value is found, then an associated offset value (TKFnO value) can be used for fetching the transcoded file from this offset. The fetched transcoded data can be transferred toward the requester. If a similar or matching value was not found, the received file can be transferred as is toward its destination.

If the received compressed media data doesn't start from a key frame, then a hash function can be implemented on the first N bytes received. The TDB-T can be searched for a signature that equals the hash value. If a signature is not found, then the received file can be transferred as is to its destination. If the signature exits, then the cached transcoded file, starting from the offset (TKFnO) that is associated with the signature, can be fetched and transferred to the requester.

In case that the received compressed file starts from an offset and is associated with a metadata, then a transcoded file can be sent instead of the received media file. The transcoded file can be associated with metadata that is modified to comply with the transcoded file.

Some exemplary embodiments, to accelerate the responses for current active requester, may manage a plurality of Sessional Transcoded DB Tables (STDB-T). Each STDB-T can be associated with a certain requester and a certain media file (a certain current URL) that is currently active, for example. Each exemplary STDB-T can include a section of the TDB-T with information that is related to media file that are currently used by the reqeuster.

The above disclosed exemplary methods and systems implement a seek operation on a transcoded media file. The disclosed exemplary methods and systems can utilize the web server itself for determining the requested offset, in bytes, from the beginning of the original compressed media file. In addition the compressed video data, delivered from the offset pointed by the web server, can be used for identifying the location of the appropriate key frame, in the transcoded media file, by implementing a hash function on the compressed video data received from the web server from the requested offset.

The foregoing summary is not intended to summarize each potential embodiment or every aspect of the present invention, and other features and advantages of the present invention will become apparent upon reading the following detailed description of the embodiments with the accompanying drawings and appended claims.

Furthermore, although specific exemplary embodiments are described in detail to illustrate the inventive concepts to a person skilled in the art, such embodiments can be modified to various modifications and alternative forms. Accordingly, the figures and written description are not intended to limit the scope of the inventive concepts in any manner.

Other objects, features, and advantages of the present invention will become apparent upon reading the following detailed description of the embodiments with the accompanying drawings and appended claims.

BRIEF DESCRIPTION OF THE SEVERAL VIEWS OF THE DRAWING

Exemplary embodiments of the present disclosure will be understood and appreciated more fully from the following detailed description, taken in conjunction with the drawings in which:

FIG. 1 illustrates a block diagram with relevant elements of an exemplary Access Network Operator Premises in which an exemplary embodiment of the present disclosure can be implemented in;

DETAILED DESCRIPTION OF EMBODIMENTS OF THE INVENTION

The present invention, as well as features and aspects thereof, is directed towards providing a solution to generate transcoded media files from requested original compressed media files, and then transmit the transcoded media files to a requester rather than the original compressed media files. Advantageously, the disclosed solutions provide a more bandwidth efficient downloading of media files to a requesting device. In addition, the disclosed solutions also fully support the seek function that is typically employed in media player devices. By correlating the requested original compressed media files time-wise with the generated transcoded media files, seek requests generated by a requesting device can be mapped to the appropriate or a close proximity to the transcoded media file.

Turning now to the figures in which like numerals represent like elements throughout the several views, exemplary embodiments of the present disclosure are described. For convenience, only some elements of the same group may be labeled with numerals. The purpose of the drawings is to describe exemplary embodiments and not for production. Therefore features shown in the figures are chosen for convenience and clarity of presentation only.

Figure 1:
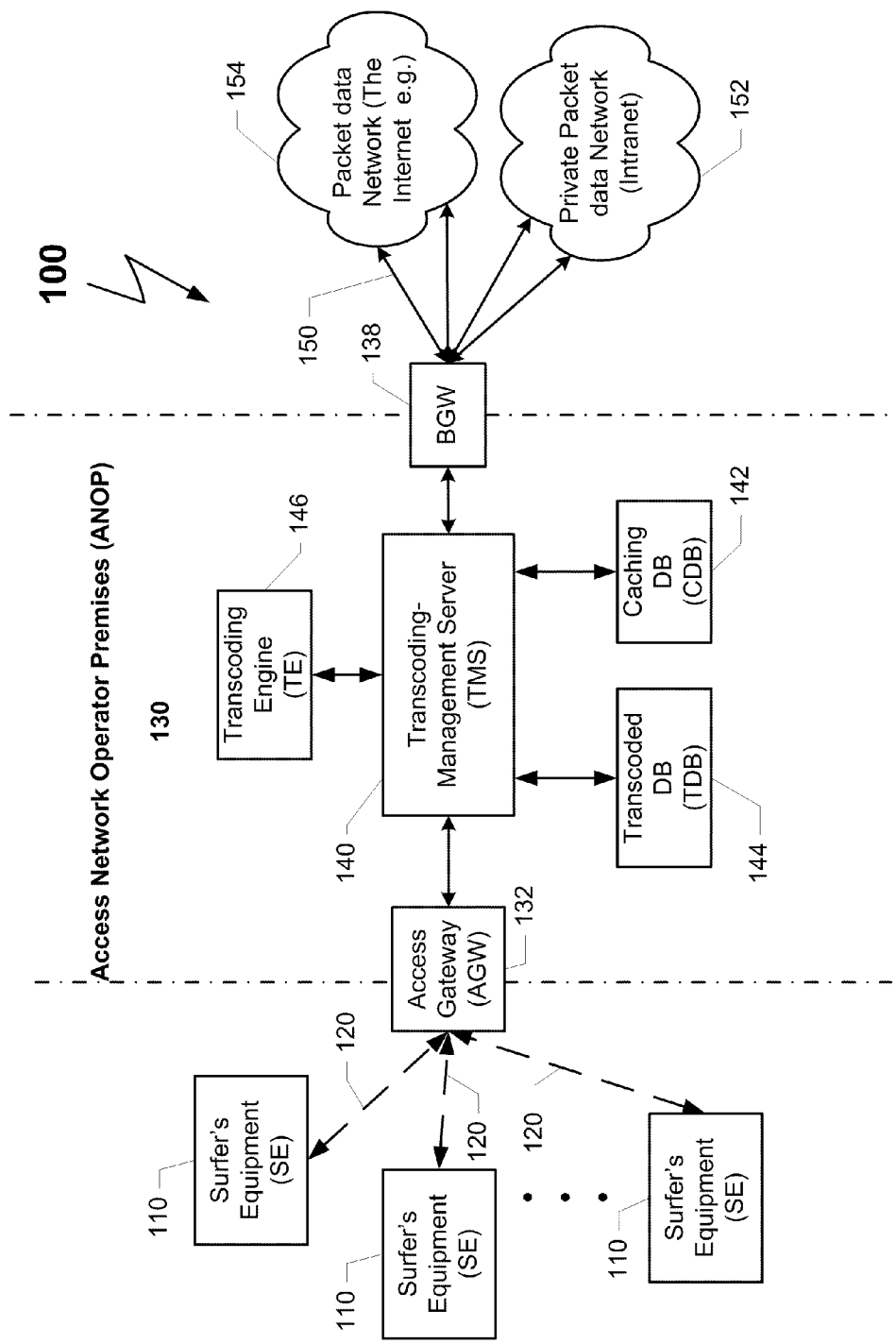

FIG. 1 depicts a block diagram with relevant elements of an exemplary system 100 in which an exemplary embodiment of the present disclosure can be implemented, according to exemplary teaching of the present disclosure. System 100 can comprise an Access Network Operator Premises (ANOP) 130. The ANOP 130 can be a cellular operator, a telecom operator, an Internet provider, a satellite communication service provider, a Public Switched Telephone Network (PSTN) operator, etc. Other exemplary embodiments of the present disclosure can be installed at an Internet Service Provider (ISP) premises, and so on.

An ANOP 130 can provide different services to a plurality of different surfers (or to the surfer equipment SE utilized by a surfer) 110. A few non-limiting examples of typical surfer equipment (SE) 110 can be: a laptop, a mobile phone, a PDA (personal digital assistance), a computer, etc. A few non-limiting examples of services provided by an ANOP can include: spam filtering, content filtering, bandwidth consumption distribution, transcoding, etc. An ANOP 130 is required to identify a plurality of SE 110 at its ingress by an access gateway 132 (AGW) for example. A few non-limiting examples of an AGW 132 include: a Serving GPRS Support Node (SGSN) in a GSM network, a PDSN in a CDMA network, etc. An exemplary ANOP 130 can be required to: identify the services being requested by a surfer; identify the services a subscriber is entitled to receive; route traffic of the subscriber through the appropriate services; and output the modified data, for example. The communication links between the SE 110 and the AGW 132 can be access communication links (also shown by arrows in the drawing), for example.

An SE 110 can be connected to the AGW 132 through different communication links 120. The communication links 120 can be, as non-limiting examples, wireless links, wired links, ADSL links, cellular links, and so on. The ANOP 130 can comprise, at its output, a boarder gateway (BGW) 138. The BGW 138 can be an Internet Protocol router, for example. The BGW 138 can be connected to a plurality of packet data networks 154 such as, but not limited to, the Internet. The BGW 138 can also be connected to private packet data networks 152 such as, but not limited to an intranet, LAN, WAN, etc. The communication between the BGW 138 and the packet data network 154 and/or private packet data network 152 over the communication links 120 can be packet oriented based on the Internet Protocol (IP), for example.

An exemplary embodiment of a Transcoding-Management Server (TMS) 140 can be implemented in an ANOP 130. The TMS 140 can receive data packet communication from the plurality of SE 110 via the AGW 132. In one direction, the TMS 140, can intercept the packet data traffic received from the SE 110, identify requests for fetching compressed media files, process the request and send the processed packets toward the packet data networks 154 and/or private packet data networks 152, for example. The intercepted and modified traffic can be output via the BGW 138.

In the other direction, Data packet communication arriving from the packet data networks 154 or private packet data networks 152 toward the SE 110 can pass through the BGW 138 toward the TMS 140. The TMS 140 can intercept the packet data traffic between the packet data networks 154 or private packet data networks 152 and the SE 110; identify original compressed media files, and determine whether a original compressed media file can be replaced by a transcoded media file. If it can be replaced, then the transcoded media file is sent toward the appropriate SE 110 via the AGW 132. If the original compressed media file cannot be replaced by the transcoded file, the compressed file is transferred as is toward the appropriate SE 110.

An exemplary TMS 140 can be associated with one or more databases (DB). One exemplary DB can be used for storing a plurality of media files that are waiting to be transcoded—this DB can be referred as a Caching database (CDB) 142. A second exemplary DB can be used for storing a plurality of transcoded video files—this DB can be referred to as a Transcoded database (TDB) 144. In some exemplary embodiments, a single DB can be used for storing both of these two types of video files.

A plurality of tables can be used by the TMS 140 to assist the TMS 140 in different operations. Non-limiting examples of the operations include: managing different databases; offline transcoding operation; online responding to a request for a Media file, and so on. The CDB 142 can be managed by using a CDB Table (CDB-T), for example. The CDB-T can have a plurality of entries with each entry being associated with a received original compressed media file, for example. The TDB 144 can be managed by a TDB table (TDB-T), for example.

An exemplary TMS 140 can scan the CDB-T, and select the next original compressed media file to be transcoded. The selection can be based on different information stored in the management fields of the CDB-T. Information such as, but not limited to: the number of requests for the media file, the time from the last request, etc. The selected original compressed media file with its metadata can be sent to a transcoding engine (TE) 146. An exemplary TE 146 can use a variety of transcoding programs, such as the ones available in the FFMPEG library (a free software library that provides a cross-platform solution to record, convert and stream audio and video), or a commercial transcoding server such as the one that is manufactured by RipCode Texas. A reader who wishes to learn more about transcoding servers can access the RipCode website at the following URL: www<dot>ripcode<dot>com, as well as other sites and literature.

Upon receiving the transcoded media file with its metadata from the TE 146, the TMS 140 can allocate a new section in the TDB 144 for storing the transcoded file and a new section in the TDB-T. The section in the TDB-T can be associated with the original compressed media file. As a non-limiting example, the association can be made by storing a URL from which the original compressed media file was received. In addition, each section in the TDB-T can include a pointer to the location in the TDB 144 in which the transcoded media file and its metadata will be stored.

Alternatively, to alleviate the overhead of having to process frequent changes in the URLs, an exemplary embodiment can implement a hash function to associate the section in the TDB-T with the original compressed media file. The hash function, for example, can be performed on N bytes from the beginning of the original compressed media file and then the hash value can be used, instead of the URL, for identifying the appropriate original compressed media file. The TMS 140 can perform hash functions (also referred to as signatures) multiple times along the compressed file, and store each of the signature values in the TDB-T as well. More information regarding the signatures is disclosed below in description of FIG. 2.

An exemplary embodiment of a TMS 140 can intercept a request from the SE 110 for a media file. The request for a media file can be sent from a media player. For instance, the media player may be a stand-alone device operating as the SE 110 or, may take on a different configuration such as a software application running on the SE 110, for example. A typical media player may send the request for the media file to a web server located in a packet data network 154 or in a private packet data network 152. The TMS 140 can intercept and process the request. An exemplary embodiment of the TMS 140 can transfer the processed request to its intended destination via the BGW 138, for example. In the other direction, the TMS 140 can intercept and process a response related to the request for the media file, wherein the response is received from that destination of the request via the BGW 138. The destination of the request can be a web server, a dedicated platform, or any other web accessible device that can provide the media file. The response can be an original compressed media file, for example.

The TMS 140 can perform a hash function (signature function) on a number of bytes of the received original compressed media file, N bytes for example, from the beginning of the received original compressed media file. In this example, the value of N can be a predefine number of bytes, such as 8 K bytes as a non-limiting example. The exemplary TMS 140 can then compare the calculated hash function value to the different signatures stored in the TDB-T. Based on the results of this comparison, the received original compressed media file can be processed by the TMS 140.

If there is a match between the hash value and a signature stored in the TDB-T, then the TMS 140 can fetch the relevant transcoded file, from the relevant location in the TDB 144 that is associated with the matching signature. The relevant location can be read from the entry in the TDB-T that is associated with the signature. The TMS 140 can then transfer the fetched transcoded file toward the requesting SE 110 via the AGW 132 instead of transferring the received original compressed media file. If there is no match between the hash value and the signatures stored in the TDB-T, then the TMS 140 can transfer the received response toward the requesting SE 110 via the AGW 132 and save a copy of the compressed media file in the CDB 142. More information on the TMS 140 method, system, and on its associated tables is disclosed below.

Figure 2:
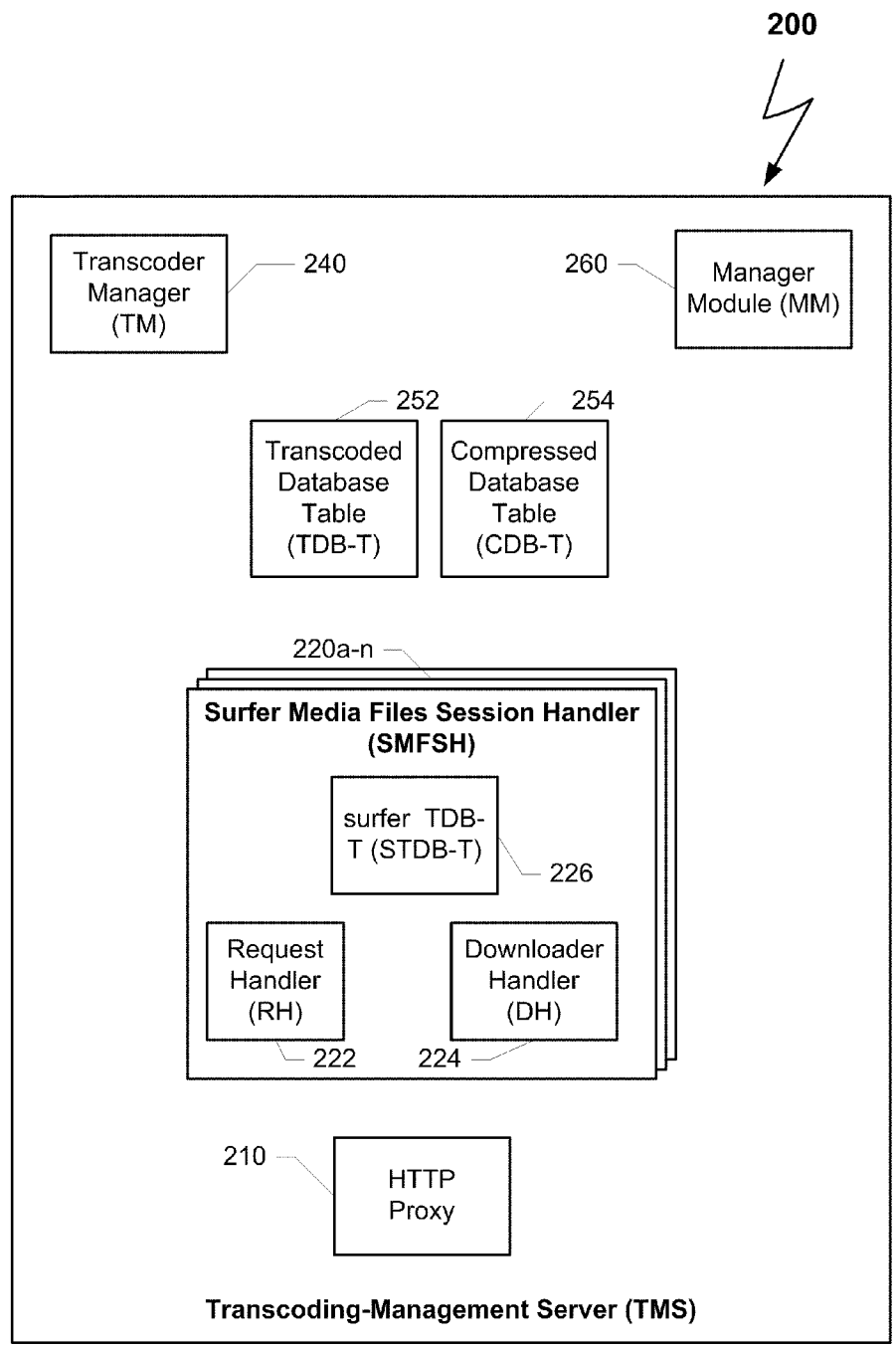
FIG. 2 illustrates a block diagram with relevant elements of an exemplary Transcoding-Management Server, according to the teaching of the present disclosure.

FIG. 2 depicts a block diagram with relevant elements of an exemplary Transcoding-Management Server (TMS) 200. The TMS 200 can be an exemplary embodiment of TMS 140 (illustrated in FIG. 1). An exemplary embodiment of the TMS 200 can include, but is not limited to, a TDB-T 252 and a CDB-T 254. The TDB-T 252 and the CDB-T 254 can assist the TMS 200 in different operations. A few non-limiting examples of these operations include: managing a plurality of databases; offline transcoding operation; online handling of compressed media files, and so on.

The CDB-T 254 may have a plurality of entries stored therein with each entry being associated with an original compressed media file. Each entry in the CDB-T can include information that is relevant to the original compressed media file. This information may include, but is not limited to: a hash value of the first N bytes of the original compressed media file, a pointer to the beginning of the metadata of the original compressed media file; a pointer to the beginning of the original compressed media file in the CDB 142 (FIG. 1); etc. Other fields related to the original compressed media file can be used to store management data such as, but not limited to: the time the first request for the media file was received, the time of the last request for the media file was received, a counter on the number of requests that have been received for the media file, the compression standard, the length in seconds of playing the video file, and so on. The CDB-T 254 can be used for determining which original compressed media file from the CDB 142 (FIG. 1) needs to be processed. The processing performed on the original compressed media file may include transcoding the original compressed media file, deleting the original compressed media file, as well as other processes.

The TDB-T 252 can have a plurality of sections. Each section of the TDB-T can be associated with a transcoded media file. For example, each section can include: a signature that was received in response to executing a hash function on the beginning of the relevant original compressed media file; a pointer to the beginning of the metadata of the relevant transcoded media file; a pointer to the beginning of the relevant transcoded media file in the TDB 144 (FIG. 1); etc. Other information can also be included, such as management data as a non-limiting example. Non-limiting examples of management data can include: the time of receiving the first request for the media file, the time of receiving the last request for the media file, a counter for the number of requests for the media file, the compression standard, the length in seconds of playing the video file, and so on. The management data can be used for determining which transcoded file can be deleted, for example.

As previously described, the section in the TDB-T 252 can be associated with the relevant original compressed media file by storing the URL from which the original compressed media file was received, a hash function on N bytes from the beginning of the original compressed media file and/or other linking information. In addition each section in the TDB-T 252 can include a pointer to the location in the TDB 144 in which the transcoded media file and its metadata will be or has been stored.

Each section in the TDB-T 252 can include a plurality of entries. Each such entry can be associated with a key frame in the transcoded media file, for example. Further, each entry can include a plurality of fields. Non-limiting examples of fields that can be stored in exemplary embodiments include: a field for storing one or more associated signatures; a field for storing an offset (i.e. in bytes or other units), of the beginning of the transcoded key frame from the beginning of the transcoded media file; a field for storing a timecode of the transcoded Key frame; etc.

An exemplary embodiment of the TMS 200 can include, but is not limited to, a Transcoder manager (TM) 240. The TM 240 can manage the transcoding operation of the TMS 200. An exemplary TM 240 can scan the CDB-T 254 and determine which file to transcode next, which file to delete, etc. The decision can be based on different management data stored in the CDB-T 254, for example. In some embodiments, the TM 240 may decide whether to transcode or delete a file based on the number of requests for the file, the size of the file, the compression standard of the file, the age of the file, etc. A selected original compressed media file can be sent toward the TE 130 (FIG. 1) for being transcoded. The TM 240 can then allocate a section in the TDB 144 (FIG. 1) and in the TDB-T 252, for the transcoded media file which will be received from the TE 130 or, the TM 240 can wait until the transcoded media file is received prior to allocating the sections. The process of scanning the CDB-T 254 for a file to be transcoded, and transcoding the file itself can be performed either online or offline.

The TM 240 can fetch a file from the CDB 142 (FIG. 1), and send it to the TE 146 (FIG. 1) to be transcoded. The TE 146 can transcode the received compressed file and send the transcoded file and its metadata back to the TM 240. Exemplary transcoding operations can transcode a compressed video file from an H.263 compression standard into an MPEG 4 or H.264 compression standards, for example. Upon receiving the transcoded media file, the TM 240 can allocate, for each transcoded Key frame, TKFn, an entry in an appropriate section of TDB-T 252, for example.

If metadata is associated with the transcoded file, then the TM 240 can parse the metadata of the received transcoded file to retrieve the time-code in seconds and the offset, in bytes, of the beginning of each transcoded Key frame (TKF) from the beginning of the transcoded file. The transcoded-Key-frame Offset (TKFO) of each TKFn (TKFnO) from the beginning of the transcoded file, can be written in an appropriate field in the relevant entry of TDB-T 252. The time-code of the transcoded Key frame (TKFTC), which is the playing time of the transcoded key frame from the beginning of the playing transcoded file, also can be written in an appropriate field in the entry of the relevant TKFn, for example. If no metadata is associated with the transcoded file, then the TM 240 can parse the transcoded file to retrieve the value of the TKFnO and the TKFn timecode of each of the transcoded Key frames (TKFnTC), for example.

Upon completion of these activities, the TDB-T is ready to be filled with signatures that associate the transcoded key frames (TKF) with relevant locations in the relevant original compressed media file. The signatures can be performed on the original compressed media file in a plurality of locations. As a non-limiting example, these locations can be: the first N bytes of each compressed key frame in the original compressed media file; each N bytes starting from an offset in the value of each TKFnO; etc.

In an exemplary embodiment, the signatures can be implemented in two cycles. In the first cycle, for each entry in the section of the TDB-T, the TKFnO value is retrieved and the TM 240 can implement the hash function on N bytes starting from the value of TKFnO from the beginning of the compressed file. The hash value is stored as one of the signatures in the relevant field of the entry that is associated with that TKFn. Then the TM 240 continues to the next entry (TKFn+1), and so on, until the last entry in the section.

In the second cycle the TM 240 can search the compressed file from the beginning looking for each compressed key frame. For each compressed key frame, its time-code is parsed and the TM 240 may execute the hash function on the first N bytes of the compressed key frame. Then the relevant section in the TDB-T is searched for an entry (TKFn) that has a time-code that is the closest to the time-code of the compressed key frame. Upon finding such a TKFn, the calculated hash value can be stored as an additional signature of the closest in time TKFn. Then TM 240 continues to the next compressed key frame and so on, until the end of the compressed file. At the end of the process the TM 240 can delete the original compressed media file from the CDB 142 (FIG. 1).

In other exemplary embodiments of the TMS 200, associating the TKFs of a transcoded media file with relevant locations along the relevant original compressed media file can be done by a number of cycles other than two. In yet other embodiments only one cycle of searching along the original compressed media file is used.

An exemplary embodiment of the TMS 200 can further comprise a Manager Module (MM) 260. At the initiation of the TMS 200 the MM 260 can allocate a plurality of resources that the TMS 200 will require for its operation. The MM 260 can also manage the plurality of databases (CDB 142 (FIG. 1) and TDB 144 (FIG. 1)), for example. An exemplary embodiment of the MM 260 can periodically scan the CDB 142 and the TDB 144 and delete old files that are no longer required (i.e. files which are not frequently requested or have not been requested for a threshold period of time, etc.). The MM 260 can communicate with other servers in the ANOP 130 (FIG. 1) for management information and/or for communication status and control data.

An exemplary embodiment of the TMS 200 can further comprise a plurality of Surfer-Media-Files-Session-Handlers (SMFSH) 220*a-n*. Each SMFSH 220*a-n* can be associated with a current SE 110 (FIG. 1). An exemplary embodiment of an SMFSH 220 can comprise a Surfer TDB-T (STDB-T) 226, a Request Handler (RH) 222, and a Downloader Handler (DH) 224. The MM 260 can be responsible for creating a new SMFSH 220*a-n* for a new SE 110 (FIG. 1) when needed. The STDB-T 226 comprises information that was copied from the TDB-T that is associated with the relevant session. In addition the STDB-T 226 may also store the URL from which the media file was requested. Because the URL remains is not changed during a certain session.

The TMS 200 can further comprise an HTTP proxy 210, which can be a transparent HTTP proxy, for example. An exemplary embodiment of an HTTP proxy 210, in one direction, can receive a plurality of request packets from different SEs 110 (FIG. 1). For each received packet, the HTTP proxy 210 can process the first three layers of the OSI of the received packets, for example. Accordingly, the HTTP proxy 210 can transfer the request to the RH 222 of the appropriate SMFSH 220. If no SMFSH 220 exist for that SE 110, the HTTP proxy 210 can request the MM 260 to create an SMFSH 220 for the specific SE 110, for example.

In the other direction, an exemplary HTTP proxy 210 can receive, from a web server for example, a response to the requests from the SE 110. An exemplary response can be the requested original compressed media file, for example. The HTTP proxy 210 can transfer the received responses to the DH 224 in the appropriate SMFSH 220.

An exemplary RH 222 can receive, via the HTTP proxy 210, a request from the SE 110. Non-limiting examples of requests can be: a request for a media file, a request for a media file starting from an offset that was initiated as an output of a seek operation by the media player at the SE 110 (FIG. 1), etc. An exemplary requested media file can be a Flash Video, for example. The RH 222 can parse the HTTP header of the request to check if it meets the requirements of the exemplary TMS 200. Exemplary requirements can be: a minimum number of bytes requested from the destination; and so on. The required minimum number of bytes can be the pre-defined N bytes that the TMS 200 need for executing the Hash operation on the response, for example.

If the header of the request does not meet the TMS 200 requirements, then the RH 222 can modify it to meet the requirements. An exemplary embodiment of a modification can be: changing the field in the header of the request such that the number of bytes requested by the media player of the SE 110 from the web server, the size of the first chunk of the compressed media file to be downloaded, meets a minimum requirement. A request which header meets the TMS 200 requirements can be sent as is toward its destination via HTTP Proxy 210.

In response to a request from an SE 110, the destination (i.e. the web server, can send the requested media file to the HTTP Proxy 210. The HTTP Proxy 210 can transfer the received response to the DH 224, of the appropriate SMFSH 220.

An exemplary embodiment of a DH 224 can execute a hash function (signature function) on the first N bytes from the beginning of a received media file. Non-limiting examples of a hash function can be: MD5, MD4, SHA-1, SHA, etc. According to the hash function value, the DH 224 can check if the media file already exists in the STDB-T 226. An exemplary indication that the media file already exists can be: if the calculated hash value (calculated signature) is similar to one of the signatures previously stored in the STDB-T 226.

If there is no match between the calculated signature and the stored signatures in the STDB-T 226, the DH 224 can search if there is a match with the stored signatures in the TDB-T 252. If yes, then the relevant section can be copied to the STDB-T 226. In some embodiments the URL, from where the original compressed media file was received, is written also in the STDB-T to be used along the session. The location of the transcoded media file in the TDB, which is associated to the found section and its metadata, is read.

Accordingly, the transcoded file and its metadata are fetched from the TDB 144 (FIG. 1) and are sent via the proxy 210 toward the requesting SE 110 instead of the received original compressed media file.

If there is no match between the stored signatures in the TDB-T 252 and the calculated hash value, then the received compressed file can be sent toward the requesting SE 110 and also copied to the CDB 142 (FIG. 1) and the CDB-T 252 (FIG. 2) can be updated accordingly.

If information on the media file already exists in the STDB-T 226, then the DH 224 can fetch the found entry associated with a TKF that one of its signatures matches the calculated hash value. The found entry is parsed and the field of the TKFnO is read to determine the offset of the relevant TKFn. The TKFnO can be zero indicating that the received file starts from the beginning of the media file. Any other number indicates that the received file is a response to a seek request. The TKFnO is added to the location of the beginning of the transcoded file in the TDB 144 (FIG. 1) and the transcoded data is fetched from the calculate location. Then, the DH 224 can send the fetched transcoded data toward the surfer via the HTTP Proxy 210. More information on the DH 224 operation is disclosed in conjunction with FIG. 4a and FIG. 4b.

Figure 3:
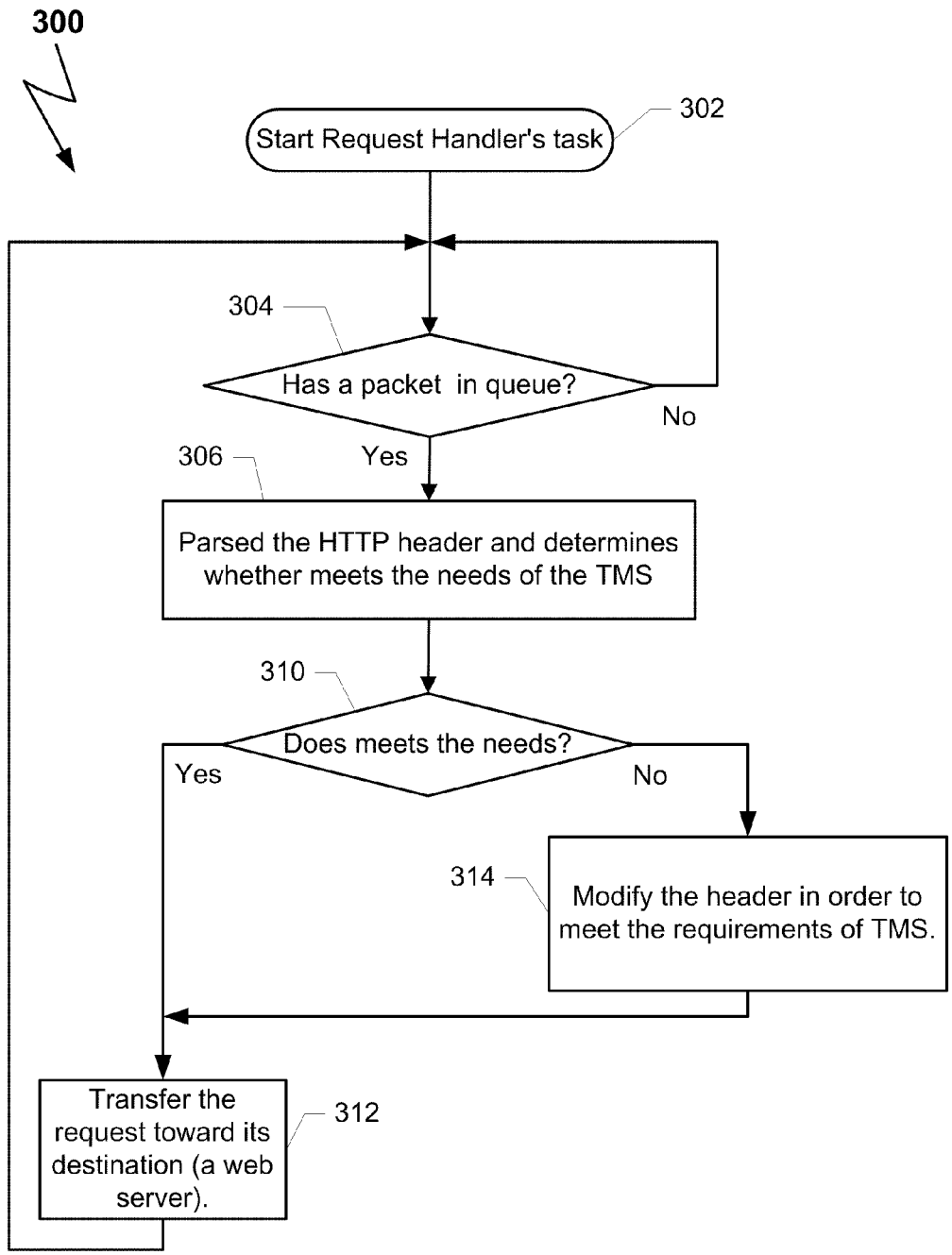
FIG. 3 illustrates a flowchart with relevant actions of an exemplary process for handling a request, according to teaching of the present disclosure.

FIG. 3 illustrates a flowchart illustrating relevant actions of an exemplary process 300 for handling a request, according to teaching of the present disclosure. The process 300 can commence upon initiating the relevant SMFSH 220 and be executed 302 by the RH 222 (FIG. 2), for example. The process 300 can check the queue at the ingress of RH 222 to determine if any packets are queued up 304 (FIG. 2). If 304 no packets are in the queue, then the process 300 can wait until a packet is placed into the queue. If 304 a packet exists in the queue, then the process 300 can proceed with the packet. The process 300 parses the HTTP header of the packet 306 to determine if the HTTP header meets the TMS 200 requirements (i.e., does the field in the HTTP header that determines the amount of bytes that will be received from the destination meet a pre-defined number of bytes). An exemplary pre-defined number of bytes can be the N number needed to perform a hash operation (signature). An exemplary N can be 8 Kbytes, for example.

If 310 the HTTP header of the packet meets the TMS 200 (FIG. 2) requirements, then the packet can be sent 312 toward its destination, a web server for example. Next the process 300 can continue to examine the queue for the next packet 304. If 310 the HTTP header of the packet does not meet the TMS 200 (FIG. 2) requirements, then the header can be modified 314 to meet the requirements. Exemplary modifications can include changing the requested number of bytes in the appropriate field of the header as a non-limiting example. Next the modified packet can be sent 312 toward its destination and the process 300 then continues to examine the queue for the next packet 304.

Figure 4A:
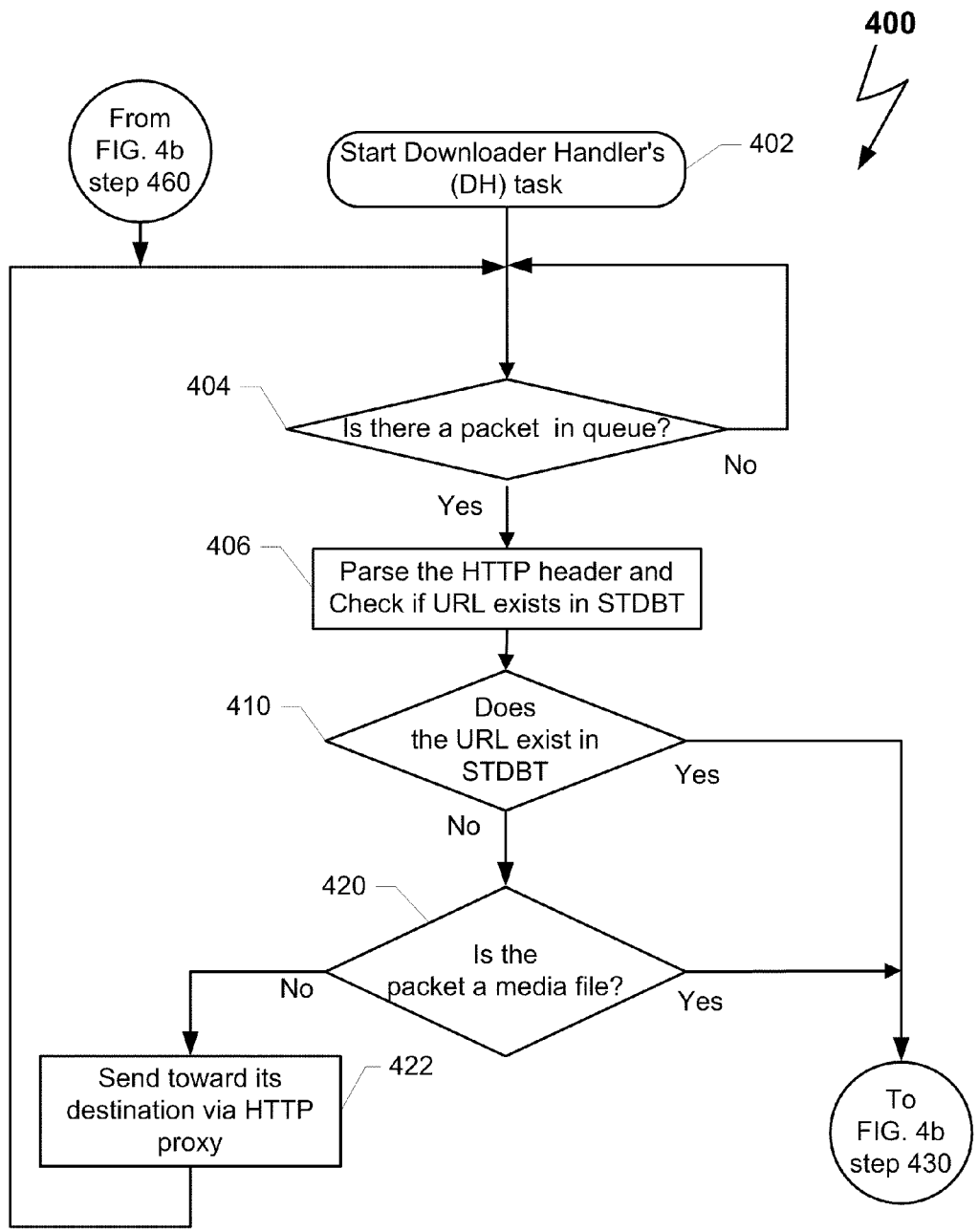
FIG. 4a and FIG. 4b illustrate a flowchart with relevant actions of an exemplary process of a downloader handler, according to teaching of the present disclosure.
Figure 4B:
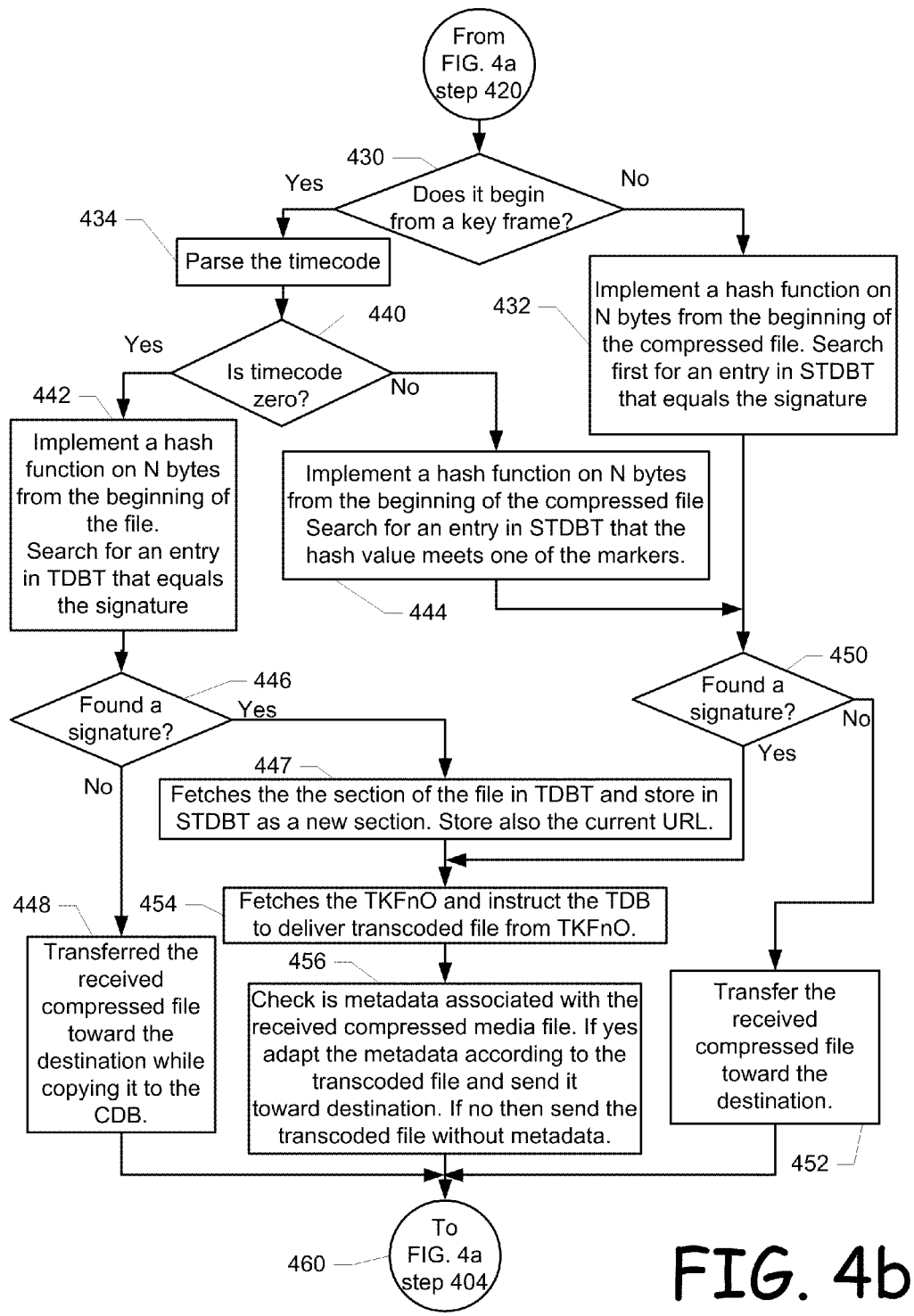

FIG. 4a and FIG. 4b illustrate a flowchart with relevant actions of an exemplary process 400 for handling the download of media files according to the teaching of the present disclosure. The process 400 can commence 402 upon initiating the relevant SMFSH 220 and can be performed by DH 224 (FIG. 2), for example. After initialization, the process 400 can check 404 if a queue supporting the ingress of the DH 224 has any packets available. For purposes of this description, a packet may represent a portion of a original compressed media file or the entire media file. If 404 no packets are in the queue, the process 400 can wait till a packet arrives and is queued. If 404 the queue contains one or more packets then process 400 can proceed by extracting the packet from the queue.

The process 400 then parses 406 the HTTP header of the packet to determine if the URL of the received packet exist in the STDBT 226 (FIG. 2). If the URL is in the STDBT 226 410, then the process 400 can proceed to determine if the packet begins from a key frame 430 FIG. 4b.

If 410 the URL of the received packet does not exist in the STDBT 226 (FIG. 2), then process 400 can proceed to determine if the packet is a media file 420. If the packet is a media file 420, then the process 400 can proceed to determine if the packet begins from a key frame 430 FIG. 4b. If the packet is not a media file 420, then the process 400 can send 422 the file, of which the HTTP header has been parsed, toward its destination via the HTTP Proxy 210 (FIG. 2), for example. Next method 400 can return to examine the queue for the next packet 404.

As previously mentioned, if the URL of the packet exists in the STDBT or, if the packet is a media file, a decision 430 needs to be made, whether the received packet, which is a portion of a compressed file begins in a key frame. If the packet does not begin in a key frame 430, then the hash function is performed 432. The hash function (signature function) can be implemented 432 on N bytes from the beginning of the received compressed media data. In some embodiments, if the received original compressed media data does not start from a key frame, the hash function can be calculated on another predefine number of bytes, M bytes. As a non-limiting example M can be 5K bytes. Once the hash function generates a hash value, the STDBT 226 (FIG. 2) can be searched 432 to determine if it contains a signature that matches the hash value. If 450 no signature that matches the hash value is found, then the process 400 can proceed by transferring 452 the compressed file toward its destination. The process 400 can continues to examine the queue for the next packet 404 FIG. 4a.

However, if a signature in the STDBT matches the calculated hash value 450, then the process 400 obtains the TKFnO from the relevant entry in the STDBT 454. The transcoded file that is associated with the obtained TKFnO is then obtained 454 from the TDB 144 (FIG. 1). If metadata for the received compressed file exists, then the metadata is adapted 456 according to the transcoded file. The transcoded file and the adapted metadata is then sent 456 together to its destination. If no metadata is associated with the received compressed file, then the transcoded file can be sent 456 without metadata. Next, the process 400 can continues by again examining the queue for the next packet 404 FIG. 4a.

Returning to the decision block illustrated as element 430 of FIG. 4b, if 430 the received compressed file begins with a key frame, then the process 400 can parse 434 the time-code of the received compressed file.

If it is determined during the parsing process 434 that the time-code value equals zero 440, then this indicates that the packet is the beginning of a media file. However, if the time-code does not equal zero 440, then the process 400 performs a hash function 444 on a predefined number of bytes (i.e., N bytes) from the beginning of the received compressed file to obtain a hash value. In some embodiments if the time-code is not zero, the hash function can be calculated on another predefine number of bytes, M bytes for example. As a non-limiting example, M can be 5K bytes. The STDBT 226 (FIG. 2) can be searched for a signature similar to the hash value. If a matching signature is found 450 in the STDBT 226, then the process 400 can continue as described above with regards to the actions presented in block 454 of the process flow.

If it is determined in the parsing process 440 that the time-code value equals zero, the hash function is also performed on N bytes from the beginning of the received compressed file to obtain a hash value. However, because the zero-valued time-code indicates that this is the beginning of a media file, it may hint that there is no section for this compressed file in the TDB-T. As such, an entry in the TDB-T 252 (FIG. 2) is searched 442 for an entry that contains a signature that equals the calculated hash value. If 446 an entry with a signature equal to the hash value is found, then the relevant section in the TDBT can be obtained 447 and stored as a new section in the STDBT 226 (FIG. 2). The current URL can also be stored 447 in the new section in the STDBT 226 (FIG. 2) as well. Then, the process 400 can continue as described above with regards to the actions presented in block 454 of the process flow However, if no matching signature is found in the TDBT, then the CDB-T is searched looking for a section that is associated with that hash value. If such an entry exists, then relevant fields in that entry can be updated. Fields such as but not limited to, the field that counts the number of requests for this file in incremented, the field that store the time of the last received request is updated, etc. If such a section does not exist, then process 400 copies the received compressed file 448 into the CDB 142 (FIG. 1), update the CDB-T accordingly, and transfers 448 the compressed file as is towards its destination. The calculated hash value of the beginning of the file can be stored also in the CDB-T as a signature of the original compressed media file. The process 400 then continues to monitor the queue for additional packets 404 FIG. 4*a*.

Figure 5:
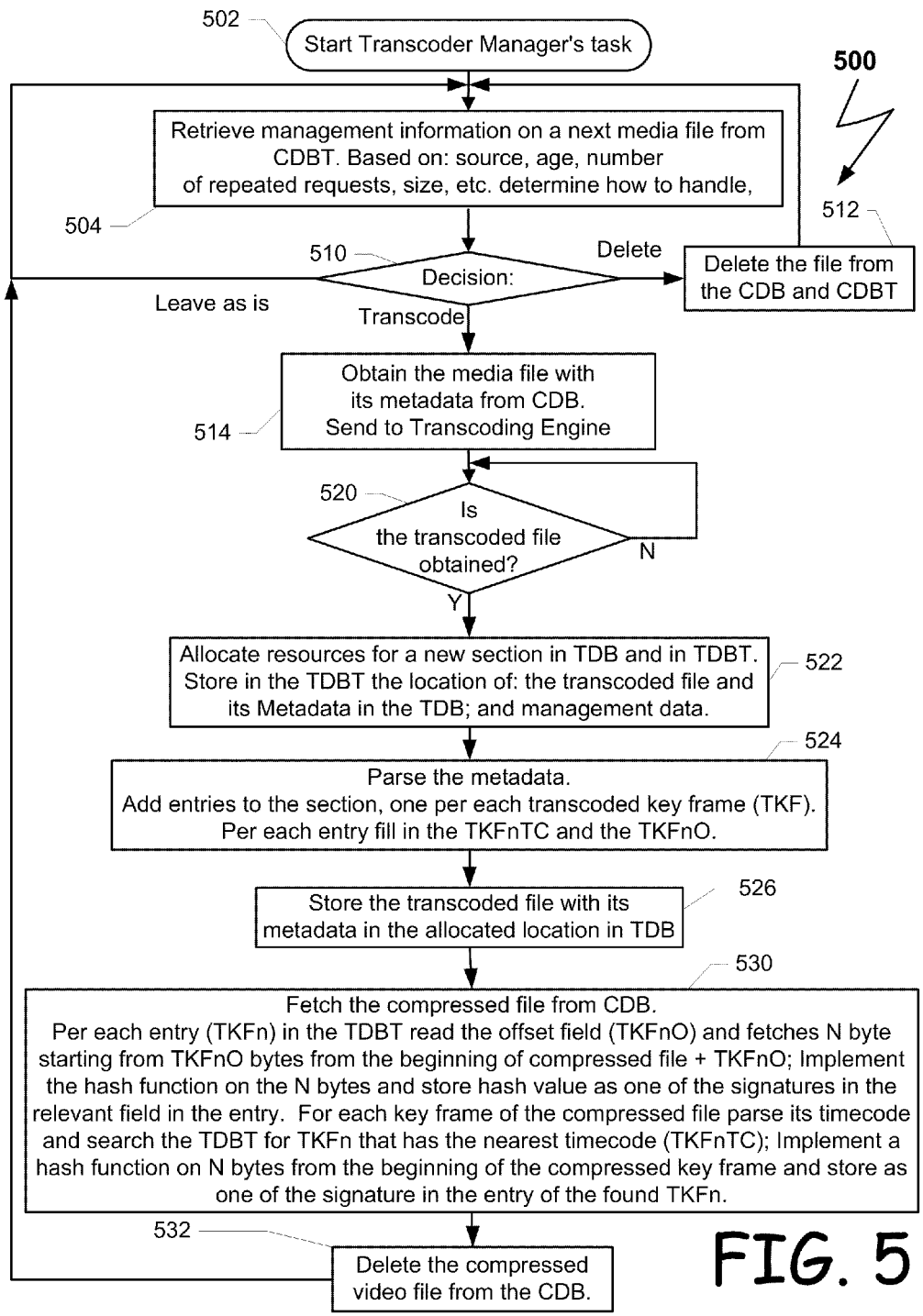
FIG. 5 illustrates a flowchart with relevant actions of an exemplary process of a Transcoder manager, according to teaching of the present disclosure.

FIG. 5 illustrates a flowchart with relevant actions of an exemplary process 500. Method 500 can commence at power on 502 or activation of a system or process employing the various described embodiments and can be executed by the Transcoder Manager (TM) 240 (FIG. 2), for example. The process operates on the original compressed media files that may be stored in the CDB 142. Management information on a next original compressed media filed stored in the CDB 142 (FIG. 1) can be obtained 504 from the CDB-T 254 (FIG. 2). Based on a variety of different parameters that may exist in the management information, a decision 510 on how to handle the stored original compressed media file can be made. The management information may include, as non-limiting examples, information such as: the source of the media file; the number of requests for that media file; the time of the last request for the media file, the size of the media file, the compression standard applied to the media file, etc.

If 510 the media file is a new file, for example, then the decision 510 can be to leave the media file as is and examine the CDB 504 for the next media file. If the decision 510 is to delete the media file because the cache is full and the number of requests for this file is low, for example, then the file can be deleted 512 from the CDB 142 (FIG. 1) and from the CDB-T 254 (FIG. 2) and examine the CDB for the next media file 504. If the decision 510 is to transcode the media file, because it has been frequently requested from different surfers, for example, then the process 500 can proceed to transcode the media file.

In transcoding the media file, first the media file is obtained 514 from the CDB 142 (FIG. 1). If the media file contains metadata, then it can be sent to the Transcoding Engine (TE) 146 (FIG. 1). If no metadata exist for the media file, then the media file can be parsed 514 and a metadata can be created, for example. The parsing can include searching for key frames and writing their offset in bytes and/or time in the metadata, for example. The metadata can be useful in associating the future transcoded file with the received compressed file.

With regards to processing this original compressed media file, the process 500 then waits for the transcoded file to be received from the TE 146 (FIG. 1). However, it should be appreciated that in some embodiments, multiple threads or processes can exist simultaneously and while the TE 146 is transcoding one media file, the process 500 may begin working on the next original compressed media file. When the transcoded file is obtained 520, then the process 500 can proceed by allocating a new section in the TDB 144 (FIG. 1) and in the TDB-T 252 (FIG. 2) 522 for the obtained transcoded file and its metadata. The location of the obtained transcoded file and its metadata can be stored 552 in the TDB-T 252 (FIG. 2) together with any management data.

The process 500 can then parse the metadata 524 for transcoded key frames. For each transcoded key frame (TKF) identified, an entry in the relevant section of the TDB-T 252 can be added 524. In each such entry, the TKFnO and/or the TKFnTC can be stored 524. The obtained transcoded file and its metadata can then be stored 526 in the relevant entry in the TDB 144 (FIG. 1).

Next, the compressed file previously obtained from the CDB 142, or if the memory has been released already the compress file can again be obtained 530 from the CDB 142 (FIG. 1). For each TKFn entry in the TDB-T, the offset field (TKFnO) can be read 530. A hash operation (signature operation) can be implemented on N bytes of the compressed file starting from the beginning of the compressed file plus TKFnO bytes. In some embodiments, in case that the TKFnO is zero, then the hash function is implemented on N bytes from the beginning of the original compressed media file. However, if the TKFnO is not zero, then the hash function is implemented on M bytes. For example, M can be a smaller number of bytes than N, 5K bytes for example. The hash value (signature) can be stored 530 as one of the signatures in the relevant field of the entry of TKFn in the TDB-T 252 (FIG. 2).

The time-code of each compressed key frame in the compressed file can be parsed 530. A TKFn that has the nearest time-code (TKFnTC) as the parsed time-code can be identified by searching 530 in the TDB-T 252 (FIG. 2). A hash function can then be implemented 530 on N bytes from the beginning of the relevant compressed key frame. In some embodiments, if the TKFnTC is zero, then the hash function is implemented on N bytes. However, if the TKFnTC is not zero, then the hash function is implemented on M bytes where M can be a smaller number of bytes than N, 5K bytes for example. The hash value (signature) can be stored 530 as one of the signatures in the relevant entry of the found TKFn that has the closest TKFnTC, for example. Next the compressed video file can be deleted 532 from the CDB and the relevant entry in the CDB-T can be deleted, then the process 500 can continue by examining the next original compressed media file in the CDB-T 504.

Figure 6:
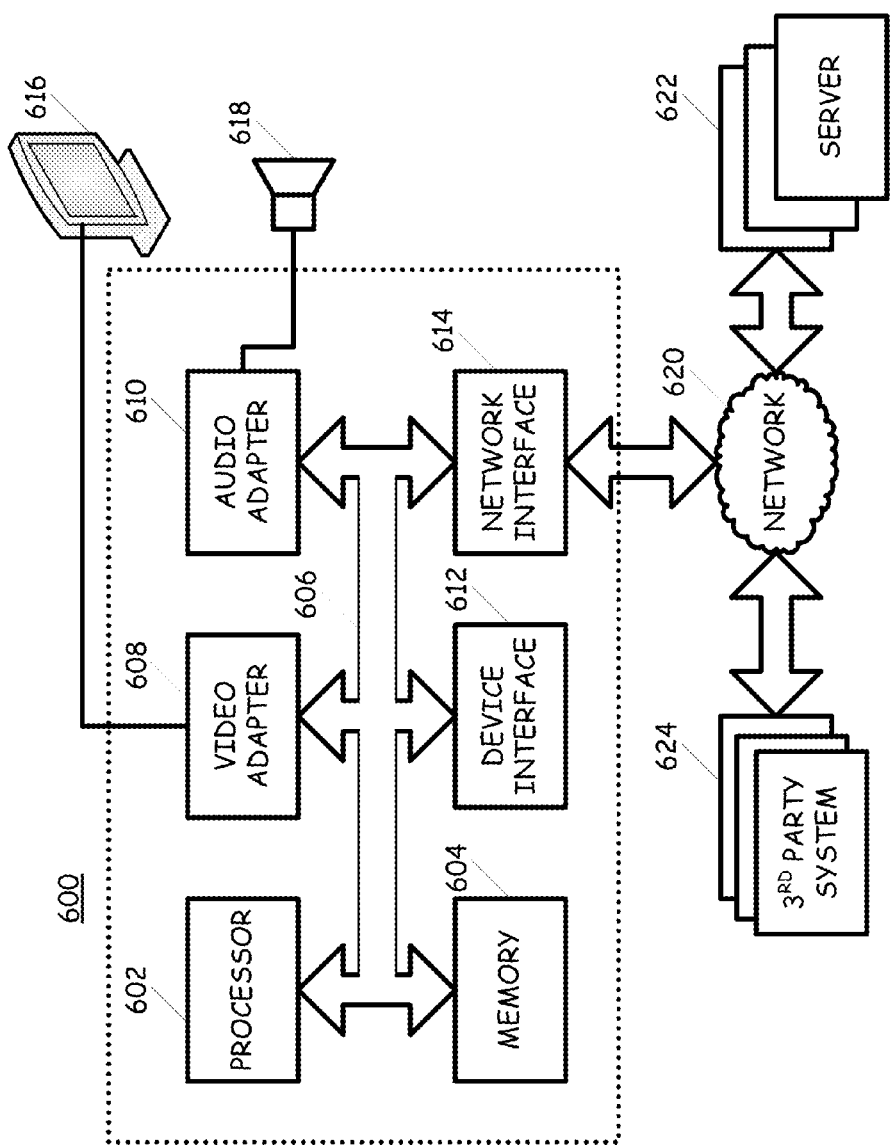
FIG. 6 is a functional block diagram of the components of an exemplary embodiment of a device that can exist in the various embodiments presented in this disclosure.

FIG. 6 is a functional block diagram of the components of an exemplary embodiment of a device that can exist in the various embodiments presented in this disclosure. For instance, the surfer system, the various components in the ANOP (i.e. the TE, the TMS, etc) and even the sourcing servers may reside on some version of the generic platform as illustrated in FIG. 6. It will be appreciated that not all of the components illustrated in FIG. 6 are required in all embodiments of the individual components but, each of the components are presented and described in conjunction with FIG. 6 to provide a complete and overall understanding of the components. The device can include a general computing platform 600 illustrated as including a processor/memory device 602/604 that may be integrated with each other or, communicatively connected over a bus or similar interface 606. The processor 602 can be a variety of processor types including microprocessors, micro-controllers, programmable arrays, DSP, custom IC's etc. and may also include single or multiple processors with or without accelerators or the like. The memory element of 604 may include a variety of structures, including but not limited to RAM, ROM, magnetic media, optical media, bubble memory, FLASH memory, EPROM, EEPROM, etc., as well as a combination of two or more of each of these memory types. The processor 602, or other components may also provide components such as a real-time clock, analog to digital converters, digital to analog converters, etc. The processor 602 also interfaces to a variety of elements including a control or device interface 612, a display or video adapter 608, an audio adapter 610, and network/device interface 614. The device interface 612 provides an interface to external devices such as sensor, actuators, keyboards, data entry devices, or the like. The display adapter 608 can be used to drive a display device 616 including an LED display, LCD display, monitor, one or more LEDs or other display devices. The audio adapter 610 interfaces to and drives elements 618 such as a speaker or speaker system, buzzer, bell, etc. The network interface 614 can be used to interface the computing platform 600 to other devices through a network 620. The network may be a local network, a wide area network, wireless network, a global network such as the Internet, or any of a variety of other configurations including hybrids, etc. The network/interface 614 may be a wired interface or a wireless interface. The computing platform 600 is shown as interfacing to a server 622 and a third party system 624 through the network 620. It will also be appreciated that other similar devices may be included in the network cloud 620 and serve as an intermediary between the computing platform 600 and a server 622 and/or third party system 624.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

In this application the words "unit", "element", "action", "process", "procedure" and "module" (collectively referred to as elements) are used interchangeably. Anything designated as a "unit", "element", "action", "process", "procedure" and "module" may be a stand-alone element or a specialized portion of another element. Further, each element may be modular or have modular aspects allowing it to be easily removed and replaced with another similar element. Each element may be any one of, or any combination of, software, hardware, and/or firmware. Software of a logical module can be embodied on a computer readable medium such as a read/write hard disc, CDROM, Flash memory, ROM, etc. In order to execute a certain task a software program can be loaded to an appropriate processor as needed.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Many other ramification and variations are possible within the teaching of the embodiments comprising different combinations of features noted in the described embodiments.

It will be appreciated by persons skilled in the art that the present invention is not limited by what has been particularly shown and described herein above. Rather the scope of the invention is defined by the claims that follow.

What is claimed is:

1. A method of delivering transcoded media, the method comprising:
   preparing a transcoded database ("TDB") in a memory element, wherein the TDB stores a plurality of transcoded media files, each transcoded media file comprising a plurality of transcoded key frames, wherein the offset in bytes from the beginning of the transcoded media file of each transcoded key frame is associated with an hash value that was calculated by implementing an hash function on data of a corresponding-original-compressed-media file at a location which is relevant to the location of that transcoded key frame from the beginning of the stored transcoded media file;
   an intermediate server obtaining a chunk of an original compressed media file from a web server, the chunk of the original compressed media file being sent by the web server in response to a seek request that was sent from a specific requester's device and, the chunk of the original compressed media file being directed toward the specific requester's device, wherein the obtained chunk is located within the original compressed media file at an offset from the beginning of the original compressed media file identified by the seek request and wherein the intermediate server is communicatively positioned between a plurality of web servers and a plurality of requesting devices, and wherein the specific requester's device is one of the plurality of requesting devices;
   calculating a hash value on a portion of the obtained chunk of the original compressed media file;
   the intermediate server selecting a transcoded media file from the plurality of transcoded media files stored in the TDB by searching for a transcoded media file associated with the calculated hash value; and
   the intermediate server sending a portion of the selected transcoded media file, starting at a point within the transcoded media file that is associated with the calculated hash value, toward the specific requester's device;
   wherein the seek request was sent while the selected transcoded media file is rendered by the specific requester's device.

2. The method of claim 1, wherein the original compressed media file is Flash video file.

3. The method of claim 1, wherein the hash values are calculated by using the MD-5 hash function.

4. The method of claim 1, wherein the portion of the obtained original compressed media file consists of a predefined number of bytes starting from the beginning of the media data in the obtained chunk of the original compressed media file.

5. The method of claim 1, wherein the intermediate server further:
   receives a request for an original compressed media file from one of the plurality of requesting devices, the request being targeted to a specific web server from the plurality of web servers;

examines the request to determine if it meets a requirement for requesting a sufficient amount of data to be processed with the hash function;

transfers the request toward the specific web server if the requirement is met; and modifies the request to meet the requirement if the request does not meet the requirement and transfers the modified request toward the specific web server.

6. The method of claim 1, wherein the obtained original compressed media file contains metadata, which is transmitted in association of the original compressed media file.

7. The method of claim 6, wherein the selected transcoded media file contains metadata, which is transmitted before the transcoded media data of the selected transcoded-media file.

8. The method of claim 1, wherein the action of preparing the TDB is performed offline and further comprises the actions of:
   a. fetching a stored original compressed media file from a memory element;
   b. transcoding the fetched original compressed media file;
   c. storing the transcoded media file into an allocated section in the TDB;
   d. allocating a section in a TDB table ("TDB-T") for storing information associated with the stored-transcoded-media file;
   e. allocating an entry in the allocated section in the TDB-T for each transcoded key frame of the transcoded media file and store into each entry information that is associated with the transcoded key frame;
   f. implementing the hash function on data at a plurality of locations in the fetched original compressed media file to generate a hash value in association with each location, wherein each location is associated with a transcoded key frame of the transcoded media file;
   g. storing each generated hash value in the entry of the relevant transcoded key frame in the TDB-T.

9. The method of claim 8, wherein the information stored in the allocated entry in the TDB-T that is associated with the stored transcoded media file comprises the location of the transcoded-media file in the TDB and a signature that is received from calculating the hash function on the beginning of the fetched original compressed media file as the signature of the allocated section.

10. The method of claim 9, wherein the stored signature is used for correlating the transcoded media file with the fetched original compressed media file from which it was created.

11. The method of claim 8, wherein the information stored in the allocated entry in the TDB-T that is associated with the transcoded key frame comprises the offset in bytes of the transcoded-key frame from the beginning of the transcoded media file.

12. The method of claim 8, wherein the information stored in the allocated entry in the TDB-T that is associated with the transcoded-key frame further comprises the time-code of the transcoded key frame.

13. The method of claim 8, wherein the plurality of locations in the fetched original compressed media file comprises location that has an offset in bytes from the beginning of the fetched original compressed media file is similar to the offset in bytes of the relevant transcoded key frame from the beginning of the transcoded-media file.

14. The method of claim 8, wherein the plurality of locations in the fetched original compressed media file comprises the beginning of a key frame of the fetched original compressed media file that has a time code that is the closest time code to the time code of the relevant transcoded key frame of the transcoded media file.

15. The method of claim 8, wherein selecting the transcoded media file and the offset in the TDB based on the calculated hash value is implemented by searching the TDB-T for an entry having a signature that is similar to the calculated hash value, retrieving the offset in bytes of the transcoded key frame that is associated with the found entry and fetching the transcoded file from the TDB based on the retrieved offset and the location of the transcoded media file in the TDB that is stored in the section of the TDB-T that contains the found entry.

16. The method of claim 15, wherein a sessional TDB-T is created when the calculated hash value on the beginning of the obtained original compressed media file matches a signature of a section in the TDB-T, then this section is copied as the sessional TDB-T and a current Uniform Resource Locator (URL) associated with the obtained original compressed media file is stored as an indication for the sessional TDB-T.

17. The method of claim 16, wherein searching the TDB-T further comprises searching a section of the TDB-T that is copied to a sessional TDB-T that is associated with the current surfing session from the current URL.

18. The method of claim 1, wherein a key frame is an Intra frame.

19. A transcoding manager system, comprising:
   one or more memory elements that store a plurality of original compressed media files and transcoded media files;
   a transcoding engine that transcodes content of original compressed media files to create the transcoded media files;
   a transcoding manager server (TMS) comprising: a transcoded database table (TDB-T) that stores information related to the transcoded media files stored in the memory element;
   a compressed-database table (CDB-T) that stores information related to the original compressed media files stored in the memory element; and
   wherein the TMS loads the one or more memory element with a plurality of transcoded media files by selecting and fetching an original compressed media file from the memory element based at least on some of the information in the CDB-T, sending the fetched original compressed media file toward the transcoding engine, obtaining the transcoding media file from the transcoding engine; storing the obtained transcoded media file in the memory element, wherein the stored transcoded media file has a plurality of key frames, each key frame is associated with an hash value that was calculated by implementing an hash function on data of the fetched-original-compressed-media file at a location which is relevant to the location of that key frame at the stored transcoded media file;
   wherein the TMS is communicatively positioned between a plurality of requesters including a specific requestor and a plurality of servers and, after obtaining from the at least one a particular server, in response to a seek request that was sent from a specific requester, a chunk within an original compressed media file associated with the seek request and targeted toward the specific requestor, the TMS responds by selecting a transcoded media file that is related to the obtained original compressed media file from the memory element and commences sending of the selected transcoded media file, starting from a specific offset from the beginning of the selected transcoded-media file, toward the specific requester instead of the obtained original compressed media file;

wherein selecting the transcoded-media file and the specific offset is implemented by calculating the hash function on a portion of the obtained chunk of the original compressed media file to generate a hash value, searching the TDB-T for an entry that has a value of the calculated hash value and selecting the transcoded media file and specific offset that is associated with that entry as the associated transcoded media and specific offset; and wherein the seek request is sent while the selected transcoded media file is rendered by the specific requester's device.

20. The transcoding manager system of claim 19, wherein the original compressed media file is a Flash video file.

21. The transcoding manager system of claim 19, wherein the hash function is an MD-5 hash function.

22. The transcoding manager system of claim 19, wherein the portion of the obtained chunk of the original compressed media file is a predefine number of bytes from the media data starting at the beginning of the obtained chunk of the original compressed media file.

23. The transcoding manager system of claim 19, wherein the TMS further obtains a request for an original compressed media file from one of the requesting devices of the plurality of requesting devices, the request being targeted to a web server from the plurality of web servers; the TMS verifies that the request matches a need associated with the hash function, and if so, the TMS transfers the request toward the targeted web server and if not, the TMS modifies the request to match the need associated with the hash function, and transfers the modified request toward the targeted web server.

24. The transcoding manager system of claim 19, wherein after receiving the transcoded media file from the transcoding engine, the TMS further:

allocates in the one or more memory elements a section in the TDB for storing the transcoded media file and a section in the TDB-T for storing information associated with the stored transcoded media file;

allocates an entry in the allocated section in the TDB-T for each transcoded-key frame of the transcoded media file and stores in each entry information that is associated with the transcoded key frame;

implements the hash function on a plurality of locations in the fetched original compressed media file wherein each location is associated with a transcoded-key frame of the transcoded media file; and stores each calculated hash value as a signature of the relevant transcoded key frame in the entry of the relevant transcoded key frame in the TDB-T.

25. The transcoding manager system of claim 24, wherein the key frames are Intra-Frame.

26. The transcoding manager system of claim 24, wherein the information associated with the stored transcoded media file is the location of the transcoded-media file in the TDB and a signature that is received from calculating the hash function on the beginning of the fetched original compressed media file as the signature of the allocated section.

27. The transcoding manager system of claim 24, wherein the information that is associated with the key frame comprises an offset in bytes of the key frame from the beginning of the transcoded media file.

28. The transcoding manager system of claim 24, wherein the information that is associated with the key frame comprises the time-code of the key frame.

29. The transcoding manager system of claim 24, wherein the plurality of locations in the fetched original compressed media file comprises the location that has an offset in bytes from the beginning of the fetched original compressed media file that is similar to the offset in bytes of the relevant transcoded key frame from the beginning of the transcoded media file.

30. The transcoding manager system of claim 24, wherein the plurality of locations in the fetched original compressed media file comprises the beginning of a key frame of the fetched original compressed media file that has a time code that is the closest time-code to the time-code of the relevant transcoded key frame of the transcoded media file.

31. The transcoding manager system of claim 24, wherein after selecting an associated transcoded media file and the offset in the TDB based on searching the TDB-T for a value similar to the calculated hash value, the TMS retrieves the offset in bytes of the transcoded key frame that is associated with the calculated hash value and fetches the transcoded file from the TDB based on the retrieved offset and the location of the transcoded media file in the TDB that is stored in the section of the TDB-T that contains the found entry.

* * * * *